United States Patent
Yang et al.

(10) Patent No.: US 10,505,984 B2
(45) Date of Patent: Dec. 10, 2019

(54) EXCHANGE OF CONTROL INFORMATION BETWEEN SECURE SOCKET LAYER GATEWAYS

(71) Applicant: A10 Networks, Inc., San Jose, CA (US)

(72) Inventors: Yang Yang, San Jose, CA (US); Xuyang Jiang, Saratoga, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 184 days.

(21) Appl. No.: 15/414,460

(22) Filed: Jan. 24, 2017

(65) Prior Publication Data
US 2017/0163633 A1 Jun. 8, 2017

Related U.S. Application Data

(63) Continuation-in-part of application No. 14/962,058, filed on Dec. 8, 2015.

(51) Int. Cl.
*H04L 29/06* (2006.01)
*H04L 29/08* (2006.01)

(52) U.S. Cl.
CPC .......... *H04L 63/20* (2013.01); *H04L 63/029* (2013.01); *H04L 63/0281* (2013.01);
(Continued)

(58) Field of Classification Search
CPC ... H04L 63/166; H04L 63/0823; H04L 67/28; H04L 63/029; H04L 63/20; H04L 67/14
(Continued)

(56) References Cited

U.S. PATENT DOCUMENTS

| 4,780,905 A | 10/1988 | Cruts et al. |
| 5,511,122 A | 4/1996 | Atkinson |

(Continued)

FOREIGN PATENT DOCUMENTS

| TW | I241818 B | 10/2005 |
| WO | WO1999048303 A2 | 9/1999 |

(Continued)

OTHER PUBLICATIONS

Spatscheck et al., "Optimizing TCP Forwarder Performance", IEEE/ACM Transactions on Networking, vol. 8, No. 2, Apr. 2000, pp. 146-157.

(Continued)

*Primary Examiner* — Oleg Korsak
*Assistant Examiner* — Feliciano S Mejia
(74) *Attorney, Agent, or Firm* — Keith Kline; The Kline Law Firm PC

(57) ABSTRACT

Provided are a method and a system for exchanging control information between secure socket layer (SSL) gateways. The method may commence with intercepting, by a client facing node, a client request including session-specific information and a session request to establish an SSL communication session between a client and a server. The method may continue with generating an SSL extension based on the session-specific information and adding the SSL extension to the session request to obtain an extended session request. The extended session request may be sent to a server facing node in communication with the client facing node. The method may further include identifying the session-specific information contained in the SSL extension of the extended session request and generating a further session request for establishing the SSL communication session between the server facing node and the server. The method may further include sending the further session request to the server.

20 Claims, 12 Drawing Sheets

(52) U.S. Cl.
CPC ........ *H04L 63/0823* (2013.01); *H04L 63/166* (2013.01); *H04L 67/14* (2013.01); *H04L 67/28* (2013.01)

(58) Field of Classification Search
USPC ............ 709/227; 713/151, 153, 156; 726/12
See application file for complete search history.

(56) References Cited

U.S. PATENT DOCUMENTS

| | | | |
|---|---|---|---|
| 5,584,023 A | 12/1996 | Hsu | |
| 5,757,908 A | 5/1998 | Cooper et al. | |
| 5,805,801 A | 9/1998 | Holloway et al. | |
| 5,835,727 A | 11/1998 | Wong et al. | |
| 5,892,903 A | 4/1999 | Klaus | |
| 5,905,859 A | 5/1999 | Holloway et al. | |
| 6,006,272 A | 12/1999 | Aravamudan et al. | |
| 6,170,061 B1 | 1/2001 | Beser | |
| 6,185,681 B1 | 2/2001 | Zizzi | |
| 6,219,706 B1 | 4/2001 | Fan et al. | |
| 6,249,866 B1 | 6/2001 | Brundrett et al. | |
| 6,259,789 B1 | 7/2001 | Paone | |
| 6,347,376 B1 | 2/2002 | Attwood et al. | |
| 6,363,486 B1 | 3/2002 | Knapton, III | |
| 6,505,192 B1 | 1/2003 | Godwin et al. | |
| 6,539,435 B2 | 3/2003 | Bolmarcich et al. | |
| 6,553,005 B1 | 4/2003 | Skirmont et al. | |
| 6,578,147 B1 | 6/2003 | Shanklin et al. | |
| 6,735,702 B1 | 5/2004 | Yavatkar et al. | |
| 6,973,040 B1 | 12/2005 | Ricciulli | |
| 7,092,357 B1 | 8/2006 | Ye | |
| 7,149,892 B2* | 12/2006 | Freed ................. | H04L 63/0281 713/151 |
| 7,200,760 B2 | 4/2007 | Riebe et al. | |
| 7,221,757 B2 | 5/2007 | Alao | |
| 7,234,161 B1 | 6/2007 | Maufer et al. | |
| 7,277,963 B2 | 10/2007 | Dolson et al. | |
| 7,372,809 B2 | 5/2008 | Chen et al. | |
| 7,409,712 B1 | 8/2008 | Brooks et al. | |
| 7,478,429 B2 | 1/2009 | Lyon | |
| 7,533,409 B2 | 5/2009 | Keane et al. | |
| 7,596,695 B2 | 9/2009 | Liao et al. | |
| 7,620,733 B1 | 11/2009 | Tzakikario et al. | |
| 7,739,494 B1 | 6/2010 | McCorkendale et al. | |
| 7,823,194 B2 | 10/2010 | Shay | |
| 7,845,004 B2 | 11/2010 | Bardsley et al. | |
| 7,925,766 B2 | 4/2011 | Jayawardena et al. | |
| 7,953,855 B2 | 5/2011 | Jayawardena et al. | |
| 8,010,469 B2 | 8/2011 | Kapoor et al. | |
| 8,089,871 B2 | 1/2012 | Iloglu et al. | |
| 8,276,203 B2 | 9/2012 | Nakhre et al. | |
| 8,286,227 B1 | 10/2012 | Zheng | |
| 8,375,453 B2 | 2/2013 | Jackson et al. | |
| 8,543,805 B2* | 9/2013 | Ovsiannikov ..... | H04L 29/08792 713/150 |
| 8,700,892 B2* | 4/2014 | Bollay ................. | H04L 63/166 713/153 |
| 8,719,446 B2 | 5/2014 | Spatscheck et al. | |
| 8,881,284 B1 | 11/2014 | Gabriel | |
| 8,948,380 B2 | 2/2015 | Goto | |
| 9,077,709 B1* | 7/2015 | Dall ................... | H04L 63/0823 |
| 9,129,116 B1 | 9/2015 | Wiltzius | |
| 9,130,996 B1 | 9/2015 | Martini | |
| 9,245,121 B1 | 1/2016 | Luo et al. | |
| 9,246,926 B2 | 1/2016 | Erlingsson et al. | |
| 9,294,503 B2 | 3/2016 | Thompson et al. | |
| 9,300,623 B1 | 3/2016 | Earl et al. | |
| 9,537,886 B1 | 1/2017 | Gareau | |
| 9,565,180 B2* | 2/2017 | Yerra .................... | H04L 9/3265 |
| 9,571,465 B1 | 2/2017 | Sharifi Mehr et al. | |
| 9,584,318 B1 | 2/2017 | Yang et al. | |
| 9,584,328 B1* | 2/2017 | Graham-Cumming ..................... | H04L 9/3263 |
| 9,705,852 B2* | 7/2017 | Bollay ................. | H04L 63/166 |
| 9,961,103 B2* | 5/2018 | Williams ............ | H04L 63/1441 |
| 2002/0108059 A1 | 8/2002 | Canion et al. | |
| 2002/0165912 A1 | 11/2002 | Wenocur et al. | |
| 2003/0023876 A1 | 1/2003 | Bardsley et al. | |
| 2003/0035547 A1 | 2/2003 | Newton | |
| 2003/0123667 A1 | 7/2003 | Weber et al. | |
| 2004/0057579 A1 | 3/2004 | Fahrny | |
| 2004/0091114 A1 | 5/2004 | Carter et al. | |
| 2004/0148520 A1 | 7/2004 | Talpade et al. | |
| 2004/0172538 A1 | 9/2004 | Satoh et al. | |
| 2004/0187032 A1 | 9/2004 | Gels et al. | |
| 2005/0044352 A1 | 2/2005 | Pazi et al. | |
| 2005/0125684 A1 | 6/2005 | Schmidt | |
| 2005/0180416 A1 | 8/2005 | Jayawardena et al. | |
| 2005/0193199 A1 | 9/2005 | Asokan et al. | |
| 2005/0198099 A1 | 9/2005 | Motsinger et al. | |
| 2005/0235145 A1 | 10/2005 | Slick et al. | |
| 2005/0278527 A1 | 12/2005 | Liao et al. | |
| 2006/0179319 A1 | 8/2006 | Krawczyk | |
| 2006/0185014 A1 | 8/2006 | Spatscheck et al. | |
| 2006/0230444 A1 | 10/2006 | Iloglu et al. | |
| 2007/0143769 A1 | 6/2007 | Bu et al. | |
| 2007/0169194 A1 | 7/2007 | Church et al. | |
| 2007/0186282 A1 | 8/2007 | Jenkins | |
| 2007/0214088 A1 | 9/2007 | Graham et al. | |
| 2007/0280114 A1 | 12/2007 | Chao et al. | |
| 2007/0283429 A1 | 12/2007 | Chen et al. | |
| 2009/0077663 A1 | 3/2009 | Sun et al. | |
| 2009/0083537 A1* | 3/2009 | Larsen ................ | H04L 63/0281 713/153 |
| 2010/0131646 A1 | 5/2010 | Drako | |
| 2010/0138921 A1 | 6/2010 | Na et al. | |
| 2011/0138177 A1 | 6/2011 | Qiu et al. | |
| 2011/0188452 A1 | 8/2011 | Borleske et al. | |
| 2011/0282997 A1 | 11/2011 | Prince et al. | |
| 2012/0096546 A1 | 4/2012 | Dilley et al. | |
| 2012/0144461 A1 | 6/2012 | Rathbun | |
| 2012/0155274 A1 | 6/2012 | Wang et al. | |
| 2012/0159623 A1 | 6/2012 | Choi | |
| 2012/0170753 A1 | 7/2012 | Pandrangi et al. | |
| 2012/0173684 A1 | 7/2012 | Courtney et al. | |
| 2012/0174196 A1 | 7/2012 | Bhogavilli et al. | |
| 2012/0227109 A1 | 9/2012 | Dimuro | |
| 2012/0250866 A1 | 10/2012 | Matsuo | |
| 2012/0260329 A1 | 10/2012 | Suffling | |
| 2012/0266242 A1 | 10/2012 | Yang et al. | |
| 2013/0103834 A1 | 4/2013 | Dzerve et al. | |
| 2013/0198845 A1 | 8/2013 | Anvari | |
| 2013/0227646 A1 | 8/2013 | Haggerty et al. | |
| 2013/0243194 A1 | 9/2013 | Hawkes et al. | |
| 2013/0263256 A1 | 10/2013 | Dickinson et al. | |
| 2014/0325648 A1 | 10/2014 | Liu et al. | |
| 2014/0344925 A1 | 11/2014 | Muthiah | |
| 2015/0058977 A1 | 2/2015 | Thompson et al. | |
| 2015/0143118 A1 | 5/2015 | Sheller et al. | |
| 2015/0220745 A1 | 8/2015 | Nellitheertha et al. | |
| 2015/0281177 A1 | 10/2015 | Sun | |
| 2016/0036651 A1 | 2/2016 | Sureshchandra et al. | |
| 2016/0134655 A1 | 5/2016 | Thompson et al. | |
| 2016/0182509 A1 | 6/2016 | Kantecki et al. | |
| 2016/0226896 A1 | 8/2016 | Bhogavilli et al. | |
| 2017/0127280 A1* | 5/2017 | Backholm ............. | H04L 63/166 |

FOREIGN PATENT DOCUMENTS

| | | |
|---|---|---|
| WO | WO2000062167 A1 | 10/2000 |
| WO | WO2006039529 A2 | 4/2006 |
| WO | WO2015030977 A1 | 3/2015 |

OTHER PUBLICATIONS

Mutz, Marc, "Linux Encryption Howto," Oct. 4, 2000, available at URL: <http://encryptionhowto.sourceforge.net/Encryption-HOWTO-1.html>, 49 pages.

Obimbo et al., "A parallel algorithm for determining the inverse of a matrix for use in blockcipher encryption/decryption," Journal of Supercomputing, vol. 39, No. 2, pp. 113-130, Feb. 27, 2007.

(56) References Cited

OTHER PUBLICATIONS

Long et al., "ID-based threshold decryption secure against adaptive chosen-ciphertext attack," Computers and Electrical Engineering, vol. 33, No. 3, pp. 166-176, May 2007.

Popek, Gerald J. et al., "Encryption and Secure Computer Networks," Computing Surveys, vol. 11, No. 4, pp. 331-356, Dec. 1979.

Liebergeld, Steffen et al., "Cellpot: A Concept for Next Generation Cellular Network Honeypots," Internet Society, Feb. 23, 2014, pp. 1-6.

Lee, Patrick P. C. et al., "On the Detection of Signaling DoS Attacks on 3G Wireless Networks," IEEE INFOCOM 2007—26th IEEE International Conference on Computer Communications processings, May 6-12, 2007, pp. 1289-1297.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retreived from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retreived from the Internet: <URL:http://www.unizh.ch/home/mazzo/reports/www7conf/fullpapers/1899/com1899.htm>, 14 pages.

* cited by examiner

EXCHANGE OF CONTROL INFORMATION BETWEEN SECURE SOCKET LAYER GATEWAYS

CROSS-REFERENCES TO RELATED APPLICATIONS

This application is a continuation-in-part of U.S. patent application Ser. No. 14/962,058, entitled "IMPLEMENTATION OF SECURE SOCKET LAYER INTERCEPT," filed on Dec. 8, 2015, the disclosure of which is incorporated herein by reference in their entirety for all purposes.

TECHNICAL FIELD

This invention relates generally to data network and more particularly to a plurality of secure network gateways exchanging control information.

BACKGROUND

Security is an important aspect of network communication. User terminals often communicate to servers over secure communication sessions. However, to enforce security policies or regulations, a corporation or a public organization may need to inspect such secure communication sessions passing through a corporation data network or a public data network. Organizations typically deploy one or more security gateways to act as a proxy to the secure communication sessions to intercept secure data and process the secure data according to the security policies.

Despite secure communication sessions often adhering to standards such as a transport layer security (TLS) protocol or a secure socket layer (SSL) protocol, a client device and a server device may exchange additional proprietary information, which does not conform to the protocol, in order to establish a secure session. When such a scenario occurs, security gateways intercepting secure sessions may need to relay the proprietary information between the client device and the server device so as to allow the devices to transmit and receive the proprietary information without being aware of the security gateways.

However, when two or more security gateways are used to process the secure session between the client devices and the server devices in order to enforce the security policies, a first security gateway may be unable to relay information sent between the client device and the server device (e.g., the information uncommon for a SSL protocol) directly to a second security gateway. Therefore, an additional data communication channel is typically established between the first security gateway and the second security gateway to convey the uncommon information. However, creation of the additional data communication channel can result in increased load on the security gateways.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for exchanging control information between SSL gateways. According to one approach of the present disclosure, a system for exchanging control information between SSL gateways is provided. Specifically, the system for exchanging control information between SSL gateways may include a client facing node and a server facing node. The client facing node may be operable to intercept a client request from a client. The client request may include session-specific information and a session request being a request to establish an SSL communication session between the client and a server. The client facing node may be further operable to generate an SSL extension based on the session-specific information. Furthermore, the client facing node may be operable to add the SSL extension to the session request to obtain an extended session request. The client facing node may be further operable to send the extended session request to a server facing node. The server facing node may be in communication with the client facing node via a data traffic channel. The server facing node may be operable to identify the session-specific information contained in the SSL extension of the extended session request. Based on the session-specific information and the extended session request, the server facing node may generate a further session request for establishing the SSL communication session between the server facing node and the server. The server facing node may send the further session request to the server.

According to another approach of the present disclosure, a method for exchanging control information between SSL gateways is provided. The method may commence with intercepting, by a client facing node, a client request. The client request may include session-specific information and a session request being a request to establish an SSL communication session between a client and a server. The method may continue with generating, by the client facing node, an SSL extension based on the session-specific information. The method may further include adding, by the client facing node, the SSL extension to the session request to obtain an extended session request. The method may continue with sending, by the client facing node, the extended session request to a server facing node being in communication with the client facing node via a data traffic channel. The method may further include identifying, by the server facing node, the session-specific information contained in the SSL extension of the extended session request. The method may continue with generating, by the server facing node, a further session request for establishing the SSL communication session between the server facing node and the server. The further session request may be generated based on the session-specific information and the extended session request. The method may further include sending, by the server facing node, the further session request to the server.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
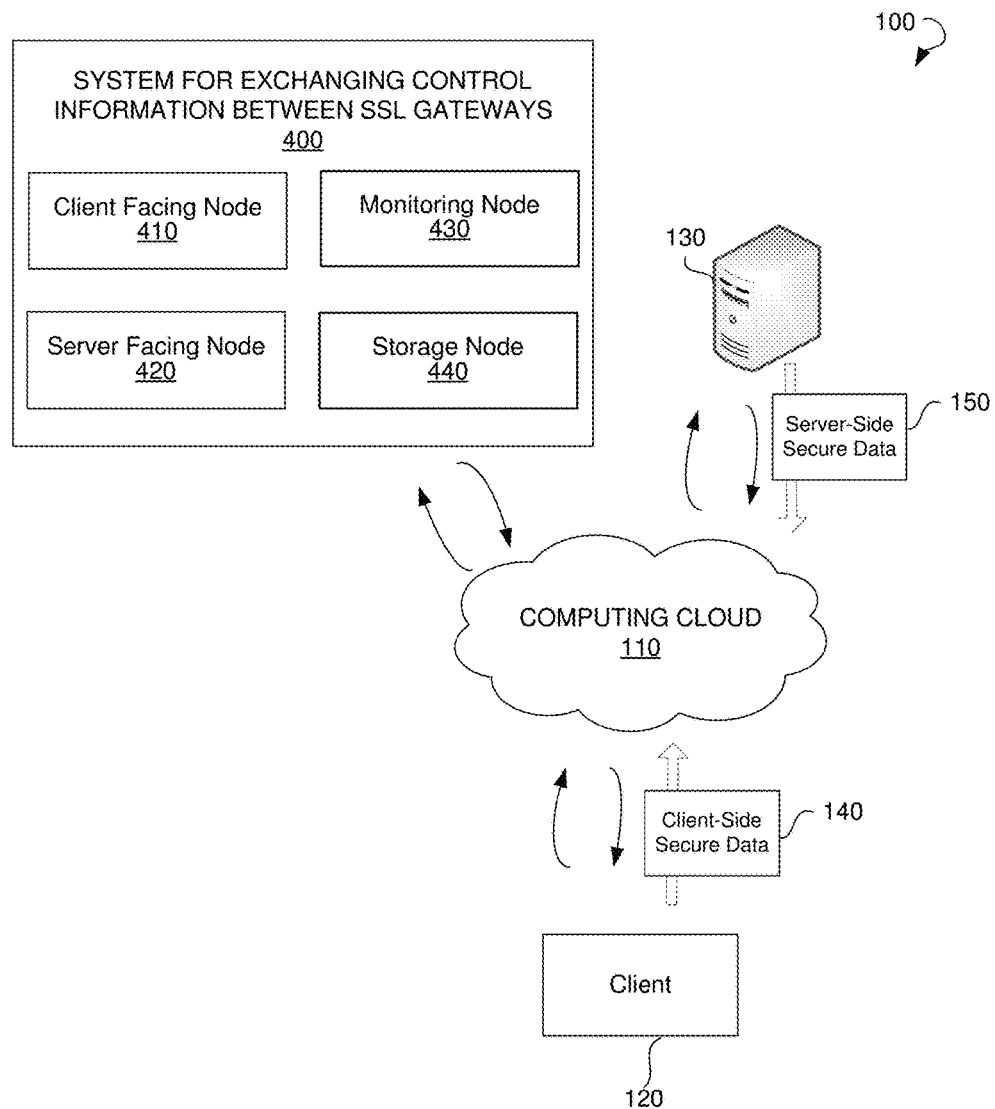
FIG. 1 shows an environment, within which methods and systems for exchanging control information between SSL gateways can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to exchanging control information between SSL gateways. Firewalls and intrusion prevention systems (IPSs) may be located between a client and a server to inspect data traffic flowing between the client and the server. The firewalls and IPSs may be unable to inspect encrypted data traffic. Therefore, the data traffic received from the client may be decrypted, sent to the firewalls and IPSs for inspection, and decrypted for sending to the server. More specifically, two SSL gateways may be located between the client and the server for intercepting the data traffic from the client, inspecting the data traffic, and forwarding the data traffic to the server. The two SSL gateways may include a client facing node and a server facing node. The client facing node may be configured to intercept the data traffic sent by the client to the server and forward the data traffic to the server facing node. The server facing node may be configured to receive the data traffic from the client facing node and direct the data traffic to the server. In some embodiments, a monitoring node may be located between the client facing node and the server facing node for inspecting the data traffic. The monitoring node may include a firewall, an IPS, an intrusion detection system, and so forth.

In an SSL session between the client and the server, the client facing node may terminate the SSL session by intercepting data packets received from the client and relay data of the data packets over a Hypertext Transfer Protocol (HTTP) session to the server facing node. The server facing node in turn may forward the data received over the HTTP session to a server over another SSL session. The client facing node, the server facing node, or the monitoring node located between them may inspect the data of the HTTP session for security, fraud, usage, and so forth based on a predetermined policy of a company associated with the client.

The data packets sent by the client to the client facing node over the SSL session may carry uncommon information, such as a Server Name Indication (SNI), domain name, and so forth, in order for the SSL session to function properly between the client and the server. Such uncommon session-specific information may be needed for establishing an SSL session between the server facing node and the server correctly. However, it may be impossible to carry such session-specific information over the HTTP session between the client facing node and the server facing node. Therefore, the server facing node may be unable to receive the session-specific information from the client facing node and forward the session-specific information to the server, resulting in an inability to establish a proper communication between the client and the server. Therefore, some client-server applications may fail.

To avoid the need to create an additional communication channel between the client facing node and the server facing node for forwarding the session-specific information, both the client facing and the server facing node may be configured to understand SSL extensions. Therefore, the client facing node may derive the session-specific information from the data packet received from the client and add the session-specific information to the data packet in a form of an SSL extension. The server facing node may receive the data packet having the SSL extension and establish the SSL session with the server based on the session-specific information contained in the SSL extension.

Referring now to the drawings, FIG. 1 illustrates an environment 100 within which methods and systems for exchanging control information between SSL gateways can be implemented. The environment 100 may include a data network, such as a computing cloud 110, a client 120, a server 130, and a system 400 for exchanging control information between SSL gateways. The client 120 may include a personal computer (PC), a laptop, a smartphone, a tablet PC, a television set, and so forth. The client 120, the server 130, and the system 400 may be connected to a data network shown as the computing cloud 110.

The data network may be not limited to a computing cloud 110 but may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes, that are interconnected for the purpose of data communication.

The system 400 may include a client facing node 410, a server facing node 420, a monitoring node 430, and a storage node 440. The client facing node 410 and the server facing node 420 may be configured to intercept client-side secure data 140 and server-side secure data 150 sent between the client 120 and the server 130. The client-side secure data 140 and server-side secure data 150 may be processed by the client facing node 410, the server facing node 420, and the monitoring node 430 of the system 400.

Figure 2:
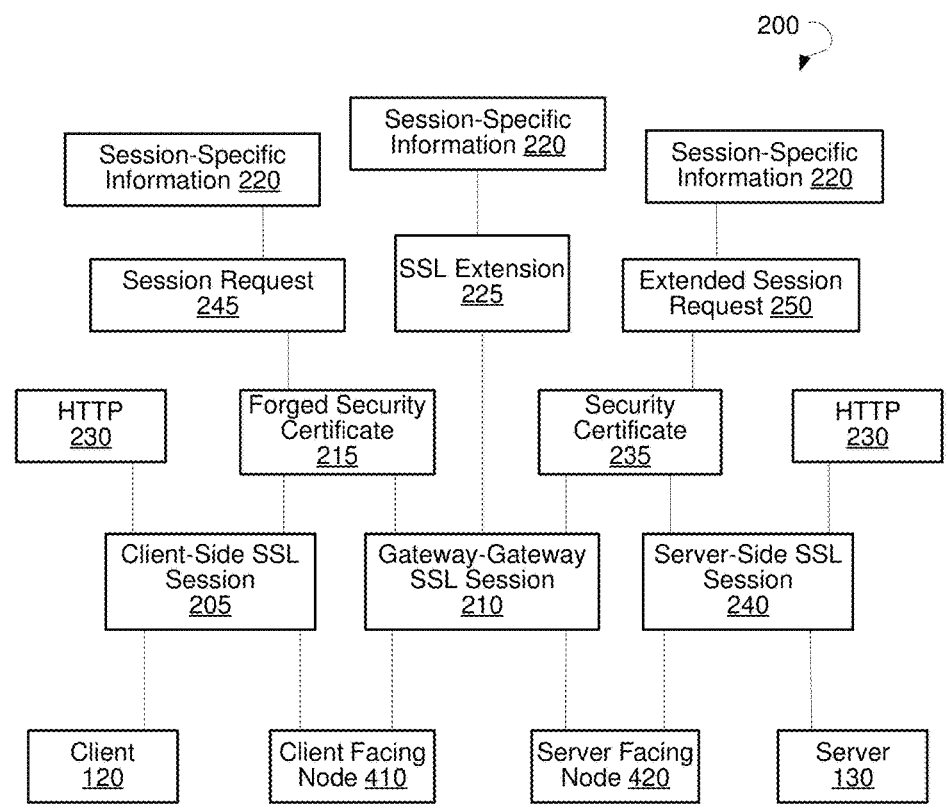
FIG. 2 illustrates sending control information between SSL gateways.

FIG. 2 is a block diagram 200 showing sending control information between SSL gateways, according to an example embodiment. A client 120 may send a session request 245 to establish an SSL session with a server 130. A first SSL gateway shown as a client facing node 410 may intercept the session request 245 and establish a client-side SSL session 205 as an SSL session between the client 120 and the client facing node 410. The client facing node 410 may be in communication via a data traffic channel with a second SSL gateway shown as a server facing node 420. The data traffic channel between the client facing node 410 and the server facing node 420 is shown as a gateway-gateway SSL session 210.

The client facing node 410 may analyze the session request 245 received from the client 120 to determine whether a security certificate 215 was previously received from the server 130. In case the security certificate 215 was previously received, the client facing node 410 may retrieve a forged security certificate associated with the security certificate 215 from a storage unit (not shown). More specifically, the client-side SSL session 205 may be established based on the forged security certificate 215.

The client facing node 410 may further analyze the session request 245 and determine that control information shown as session-specific information 220 is present in the session request 245. The client facing node 410 may use the session request 245 and the session-specific information 220 to generate an extended session request 250 to be sent to the server facing node 420. More specifically, the client facing node 410 may add the session-specific information 220 into an SSL extension 225. The extended session request 250 may include the session request 245 in a decrypted form and the SSL extension 225. For example, if the session request 245 is a Client Hello message of a handshake procedure initiated by the client 120, the SSL extension 225 may be an SSL extension to the Client Hello message. The client facing node 410 may send the extended session request 250 to the server facing node 420 over the gateway-gateway SSL session 210. More specifically, the extended session request 250 may be sent between the client facing node 410 and the server facing node 420 using an HTTP 230.

The server facing node 420 may receive the extended session request 250 from the client facing node 410. In response to the receipt of the extended session request 250, the server facing node 420 may send the extended session request 250 to the server 130. The server 130 may receive the extended session request 250 and send a security certificate 235 to the server facing node 420 in response to the receipt of the extended session request 250. The server facing node 420 may receive the security certificate 235 and establish a server-side SSL session 240 between the server facing node 420 and the server 130 based on the security certificate 235. Therefore, the SSL session between the client 120 and the server 130 may be provided using the client-side SSL session 205, the gateway-gateway SSL session 210, and the server-side SSL session 240.

Figure 3:
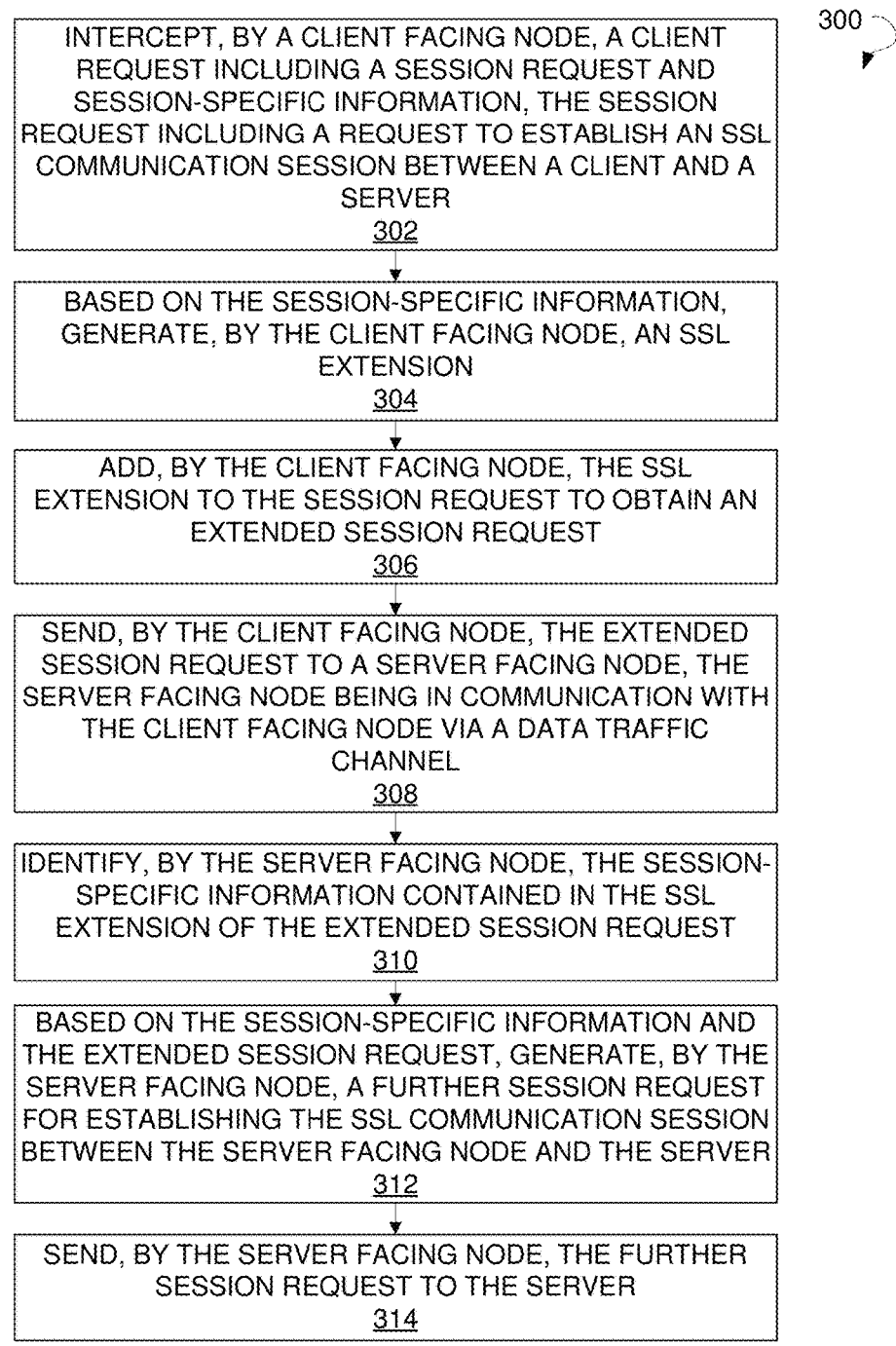
FIG. 3 shows a process flow diagram of a method for exchanging control information between SSL gateways.

FIG. 3 shows a process flow diagram of a method 300 for exchanging control information between SSL gateways, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with intercepting a client request sent by a client at operation 302. The session request may be intercepted by a client facing node. The client facing node may analyze the client request and determine that the client request includes session-specific information and a session request to establish an SSL communication session between the client and a server.

The method 300 may continue with generating an SSL extension by the client facing node at operation 304. The SSL extension may be generated based on the session-specific information.

At operation 306, the client facing node may add the SSL extension to the session request to obtain an extended session request. More specifically, the extended session request may be obtained by adding the SSL extension to a header of a data packet associated with the session request.

The method 300 may further include sending the extended session request by the client facing node to a server facing node at operation 308. The server facing node may be in communication with the client facing node via a data traffic channel.

The method 300 may continue with operation 310, at which the server facing node may identify the session-specific information contained in the SSL extension of the extended session request.

At operation 312, the server facing node may generate a further session request for establishing the SSL communication session between the server facing node and the server. The further session request may be generated based on the session-specific information and the extended session request.

The method 300 may further include sending the further session request by the server facing node to the server at operation 314.

In an example embodiment, the SSL extension present in the further session request may be ignored by the server. More specifically, the server may send the security certificate in response to the further session request received from the server facing node irrespective of the SSL extension present in the further session request.

In an example embodiment, responsive to the sending of the further session request to the server, the server facing node may receive a security certificate from the server. The security certificate may be used by the server facing node for establishing a first secure connection between the server and the server facing node. Moreover, the server facing node may forge the received security certificate to obtain a forged security certificate. The server facing node may provide the forged security certificate to the client facing node. The forged security certificate may be used by the client facing node for establishing a second secure connection between the client facing node and the client. In example embodiments, the SSL communication session between the client and the server may include the first secure connection between the server and the server facing node and the second secure connection between the client facing node and the client.

In a further example embodiment, the method 300 may include analyzing, by the client facing node, the session-specific information. Based on the analysis, the client facing node may determine that a forged security certificate is preliminarily generated by the server facing node for the server. Based on such determination, the client facing node may generate the SSL extension in a form of a control message. The control message may include an instruction for the server facing node to provide the forged security certificate to the client facing node.

In some example embodiments, the SSL extension present in the extended session request may be sent by the client facing node to the server facing node in a non-encrypted form. The session request present in the extended session request may be sent by the client facing node to the server facing node in an encrypted form. Both the client and server facing nodes may be configured to decrypt the extended session request.

In an example embodiment, the session request may be sent by the client in an encrypted form. The method 300 may include decrypting, by the client facing node, the session request to obtain a decrypted session request in a form of clear text. In this embodiment, the extended session request may be created based on the decrypted session request. Furthermore, the client facing node may add into the SSL extension an indication that the extended session request is in the form of the clear text. Therefore, decryption of the extended session request by the server facing node may be avoided.

In a further example embodiment, a monitoring node may be located between the client facing node and the server facing node. In this embodiment, the sending of the extended session request from the client facing node to the server facing node may include sending the extended session request by the client facing node to the monitoring node, inspecting the extended session request by the monitoring node based on an instruction present in the SSL extension, and sending, upon the inspection, the extended session request by the monitoring node to the server facing node.

Figure 4:
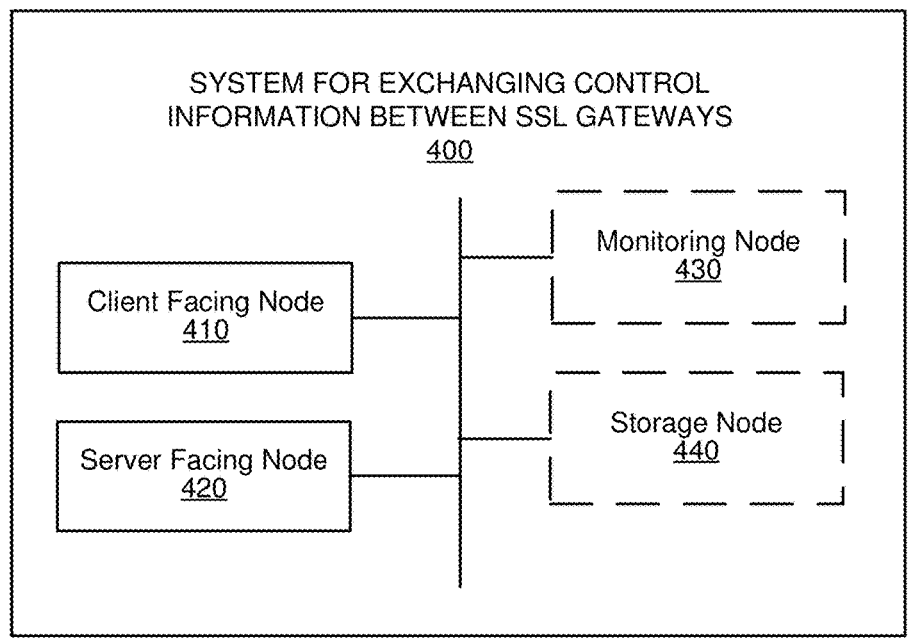
FIG. 4 shows a block diagram illustrating various modules of a system for exchanging control information between SSL gateways.

FIG. 4 shows a block diagram illustrating various modules of a system 400 for exchanging control information between SSL gateways, according to an example embodiment. Specifically, the system 400 may include a client facing node 410 being a first SSL gateway, a server facing node 420 being a second SSL gateway, and, optionally, a monitoring node 430 and a storage node 440.

The client facing node 410 may be operable to intercept a client request from a client. The client request may include a session request being a request to establish an SSL communication session between the client and a server. The client request may further include session-specific information. In an example embodiment, the session-specific information may be associated with one or more of the following: clear text, a session key (a common session key or a predefined session key), a server side forged security certificate, a client SNI, unknown information, and so forth.

The client facing node 410 may be operable to generate an SSL extension based on the session-specific information. The client facing node 410 may further add the SSL extension to the session request to obtain an extended session request. In an example embodiment, the extended session request may be obtained by adding the SSL extension to a header of a data packet associated with the session request. The client facing node 410 may be operable to send the extended session request to a server facing node 420.

In an example embodiment, the client facing node may put a control flag into the SSL extension to indicate that a pre-defined session key is to be applied for the encryption. In this embodiment, one or more monitoring nodes may decrypt the data received from the client facing node using the pre-defined session key, which may be accessed using the storage node. Therefore, the security of data packet transmission may be improved and load balancing can be performed if the one or more monitoring nodes are not in inline mode.

In a further example embodiment, the client facing node may put a control flag in the SSL extension to indicate that clear text is acceptable and put NULL cipher in a cipher list. The cipher list may be stored in the storage node and may be accessed by the client facing node 410 and the server facing node 420.

In a further example embodiment, both the client facing node and the server facing node may have public certificates of each other. The client facing node may send an encrypted known text to the server facing node for verification, or the server facing node may send an encrypted known text to the client facing node for verification. For example, the client facing node 410 may encrypt data packets with a public key associated with the server facing node and put the encrypted data packet into a Client Hello message. The server facing node may encrypt data packets with a public key associated with the client facing node and send the data packets back to the client facing node in a Server Hello message.

In some embodiments, the SSL extension may be allocated from an Internet Assigned Numbers Authority. The format of the SSL extension may be as follows: [extension ID] [length] [vendor ID] [vendor features]. The fields extension ID, length, vendor ID, and vendor features may be session-specific information.

In a further example embodiment, a security certificate may be forged at a client side or at a server side. If the security certificate is forged at a server side, the client facing node may put a control flag into the SSL extension to provide an instruction to retrieve the forged security certificate directly from security certificates stored by the server side node.

The server facing node 420 may be in communication with the client facing node 410 via a data traffic channel. The server facing node 420 may be operable to identify the session-specific information contained in the SSL extension of the extended session request. Based on the session-specific information and the extended session request, the server facing node 420 may generate a further session request for establishing the SSL communication session between the server facing node and the server. The server facing node 420 may be further operable to send the further session request to the server.

In an example embodiment, the server facing node 420 may be further operable to receive a security certificate from the server. More specifically, the server may send the security certificate to the server facing node 420 in response to receiving the further session request. In an example embodiment, the SSL extension present in the further session request may be ignored by the server and the server may send the security certificate in response to the further session request received from the server facing node.

The security certificate may be used for establishing a first secure connection between the server and the server facing node. Upon receiving the security certificate, the server facing node 420 may forge the security certificate to obtain a forged security certificate. The server facing node 420 may further provide the forged security certificate to the client facing node. The forged security certificate may be used for establishing a second secure connection between the client facing node and the client. The SSL communication session between the client and the server may include the first secure connection between the server and the server facing node and the second secure connection between the client facing node and the client.

In an example embodiment, the monitoring node 430 may be located between the client facing node 410 and the server facing node 420. In this embodiment, sending of the extended session request from the client facing node 410 to the server facing node 420 may include sending the extended session request by the client facing node 410 to the monitoring node 430, inspecting the extended session request by the monitoring node, e.g., based on an instruction present in the SSL extension, and sending the inspected extended session request by the monitoring node 430 to the server facing node 420.

In an example embodiment, the SSL extension present in the extended session request may be sent by the client facing node 410 to the server facing node 420 in a non-encrypted form. The session request present in the extended session request may be sent by the client facing node 410 to the server facing node 420 in an encrypted form.

In a further example embodiment, the client facing node 410 may be further operable to analyze the session-specific information. Based on the analysis, the client facing node 410 may determine that a forged security certificate is preliminarily generated by the server facing node for the server. Upon the determining that the forged security certificate is preliminarily generated, the client facing node 410 may insert a control message into the SSL extension. The control message may include an instruction for the server facing node to provide the forged security certificate to the client facing node.

In an example embodiment, the client facing node 410 may be further operable to decrypt the session request to obtain a decrypted session request in a form of clear text. The extended session may be created based on the decrypted session request. The client facing node 410 may add, into the SSL extension, an indication that the extended session request is in the form of the clear text, thereby avoiding decryption of the extended session request by the server facing node.

The storage node 440 may be configured to store security certificates associated with a plurality of servers, forged security certificates, and any other data needed for establishing the communication between the client, the client facing device, the server facing device, and the server.

Figure 5:
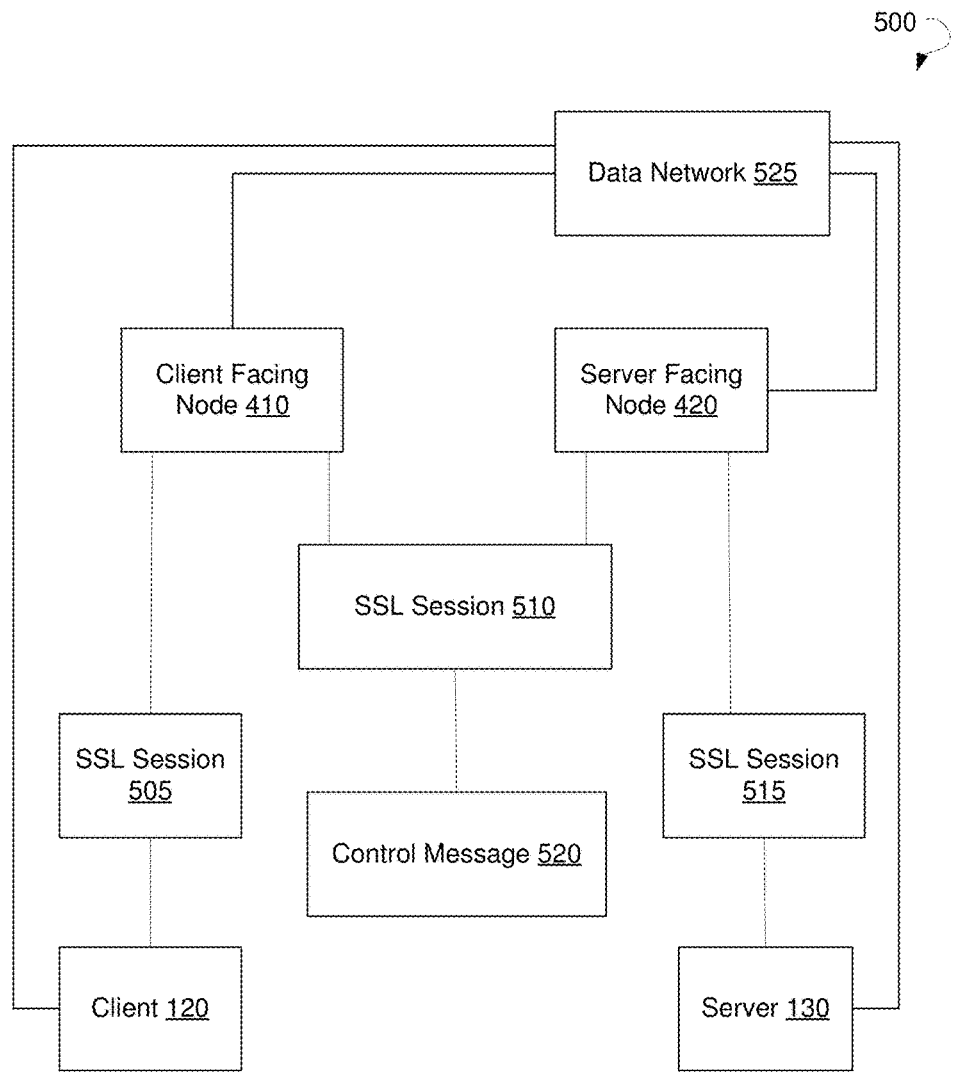
FIG. 5 is a block diagram illustrating exchange of control information between SSL gateways over a secure session.

FIG. 5 is a block diagram 500 illustrating exchange of control information between secure network SSL gateways over a secure session, according to an example embodiment. In an example embodiment, a client 120 establishes a secure SSL session with a server 130 via a plurality of SSL gateways, such as a client facing node 410 and a server facing node 420. The client 120 communicates to the server 130 over an SSL session 505 with the client facing node 410, which relays the SSL session 505 over an SSL session 510 to the server facing node 420. The server facing node 420 further relays the SSL session 510 to the server 130 over an SSL session 515. In an example embodiment, the server 130 communicates to the client 120 over the SSL session 510 with the server facing node 420, which relays SSL session 510 to the client facing node 410. The client facing node 410 further relays the SSL session 505 to the client 120 over the SSL session 505.

In an example embodiment, the client facing node 410 establishes the SSL session 510 with the server facing node 420 based on the SSL session 505. The client facing node 410 may exchange at least a control message 520 with the server facing node 420 in order to establish the SSL session 505. The control message 520 may be an extended session request created by the client facing node 410 based on data provided by the client 120 in a request to establish the secure SSL session with the server 130. In an example embodiment, the client facing node 410 may exchange the control message 520 with server facing node 420 in order to complete the establishment of the SSL session 515 between the server facing node 420 and the server 130. In an example embodiment, the client facing node 410 and the server facing node 420 exchange the control message 520 to negotiate one or more attributes for the SSL session 510.

Upon successful completion of establishing the SSL session 505, the SSL session 510, and the SSL session 515, the client 120 and the server 130 exchange data. In an example embodiment, the client 120 may send a piece of data content in a secure data packet via the SSL session 505 to the client facing node 410. The client facing node 410 may in turn relay the data content from the client 120 to the server facing node 420 in a secure data packet via the SSL session 510. The server facing node 420 may relay the data content from the client 120 to the server 130 in a secure data packet via the SSL session 515.

In an example embodiment, the server 130 may send a piece of data content in a secure data packet via the SSL session 515 to the server facing node 420. The server facing node 420 may relay the data content from the server 130 in a secure data packet via the SSL session 510 to the client facing node 410. The client facing node 410 may in turn relay the data content from the server 130 in a secure data packet via the SSL session 505 to the client 120. In an example embodiment, the client facing node 410 or the server facing node 420 may examine received data content from the client 120 or the server 130 prior to relaying the data content. In an example embodiment, each of the client facing node 410 and the server facing node 420 may decrypt the secure data packet containing the data content and examine the decrypted data content according to one or more network security applications running on the client facing node 410 or the server facing node 420.

The client facing node 410, the server facing node 420, the client 120, and the server 130 may be connected via a data network 525. In an example embodiment, the data network 525 may include a computing cloud 110 as shown on FIG. 1.

Figure 6:
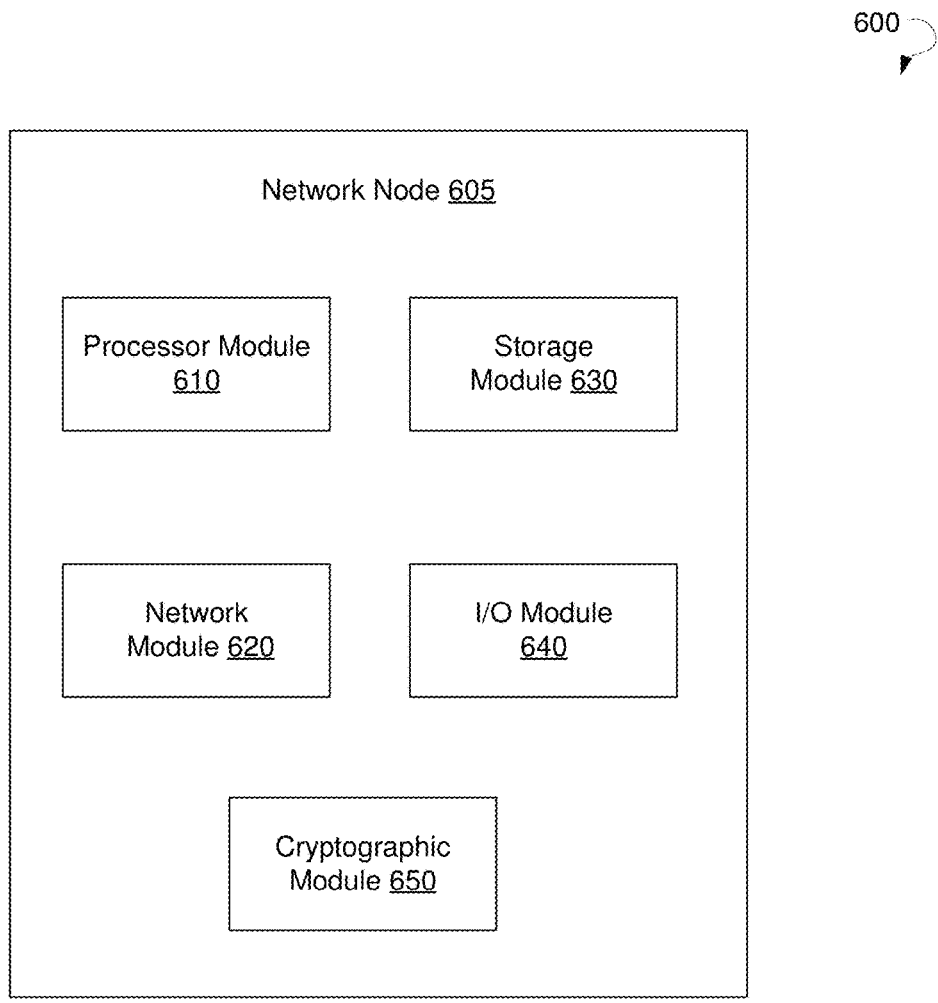
FIG. 6 is a block diagram illustrating a network node.

FIG. 6 is a block diagram 600 illustrating a network node 605, according to an example embodiment. The network node 605 may include a network computer which can be a client, a server, and an SSL gateway, such as a client facing node and a server facing node. In an example embodiment, the network node 605 may include a processor module 610, a network module 620, and a storage module 630. In an example embodiment, the processor module 610 may include one or more processors which may be a microprocessor, an Intel processor, an AMD processor, a Microprocessor without Interlocked Pipeline Stages processor, a restricted instruction set computer (RISC) processor, or an Advanced RISC Machine (ARM)-based processor. In an example embodiment, the processor module 610 may include one or more processor cores embedded in a processor. In a further example embodiment, the processor module 610 may include one or more embedded processors, or embedded processing elements in a Field Programmable Gate Array, an Application Specific Integrated Circuit, or Digital Signal Processor. In an example embodiment, the network module 620 may include a network interface such as Ethernet, optical network interface, a wireless network interface, T1/T3 interface, a WAN or LAN interface. In an example embodiment, the network module 620 may include a network processor. In an example embodiment, the storage module 630 includes random access memory (RAM), dynamic random access memory, static random access memory, Synchronous Dynamic Random Access Memory, or memory utilized by the processor module 610 or the network module 620. In an example embodiment, the storage module 630 may store data utilized by the processor module 610. In an example embodiment, the storage module 630 may include a hard disk drive, a solid state drive, an external disk, a Digital Versatile Disc (DVD), a Compact Disc (CD), or a readable external disk. The storage module 630 may store one or more computer programming instructions which when executed by the processor module 610 or the network module 620 may implement one or more of the functionality of this present disclosure. In an example embodiment, the network node 605 may include an input/output (I/O) module 640, which may include a keyboard, a keypad, a mouse, a gesture based input sensor, a microphone, a physical or sensory input peripheral, a display, a speaker, or a physical or sensual output peripheral. In an example embodiment, the network node 605 may further include a cryptographic module 650, which may include one or more hardware-based cryptographic computing modules.

Returning to FIG. 5, the client 120 may be a network node, as illustrated in FIG. 6, connected to the data network 525. The client 120 may include a PC, a laptop computer, a tablet, a smartphone, a mobile phone, an Internet phone, a netbook, a home gateway, a broadband gateway, a network appliance, a set top box, a media server, a personal media player, a personal digital assistant, an access gateway, a networking switch, a server computer, a network storage computer, or any computing device comprising at least a network module and a processor module. In an example embodiment, the server 130 may be a network node, as illustrated in FIG. 6, connected to the data network 525.

In an example embodiment, the SSL session 505 may be a secure session to support an application communication session such as an HTTP session, a file transfer session, a remote access session, a File Transfer Protocol session, a voice over Internet Protocol (IP) session, a Session Initiation Protocol session, a video or audio streaming session, an e-commerce session, an enterprise application session, an email session, an online gaming session, a teleconference session, a Web-based communication session, and so forth.

In an example embodiment, the client facing node 410 or the server facing node 420 may be a network node, as illustrated in FIG. 6. In an example embodiment, the client facing node 410 may be a traffic management controller, an application delivery controller, a server load balancer, a broadband remote access gateway, a mobile broadband gateway, an Internet access gateway, a firewall, a VPN gateway, a Transmission Control Protocol proxy gateway, or a security gateway connecting two IP data networks. In an example embodiment, the client facing node 410 or the server facing node 420 may include a security network software application configured to enforce one or more security policies. In an example embodiment, the security policies may include detection of fraud, theft, improper access of private information, improper transfer of confidential information, or improper access of network resources. In an example embodiment, the security policies may further include interception of data packets, recording of data packets, or enforcement of regulation and compliance.

In an example embodiment, the data network 525 may include an Ethernet network, an asynchronous transfer mode network, a cellular network, a wireless network, a Frame Relay network, an optical network, an IP network or any data communication network utilizing other physical layers, link layer capability, or network layers to carry data packets.

Figure 7:
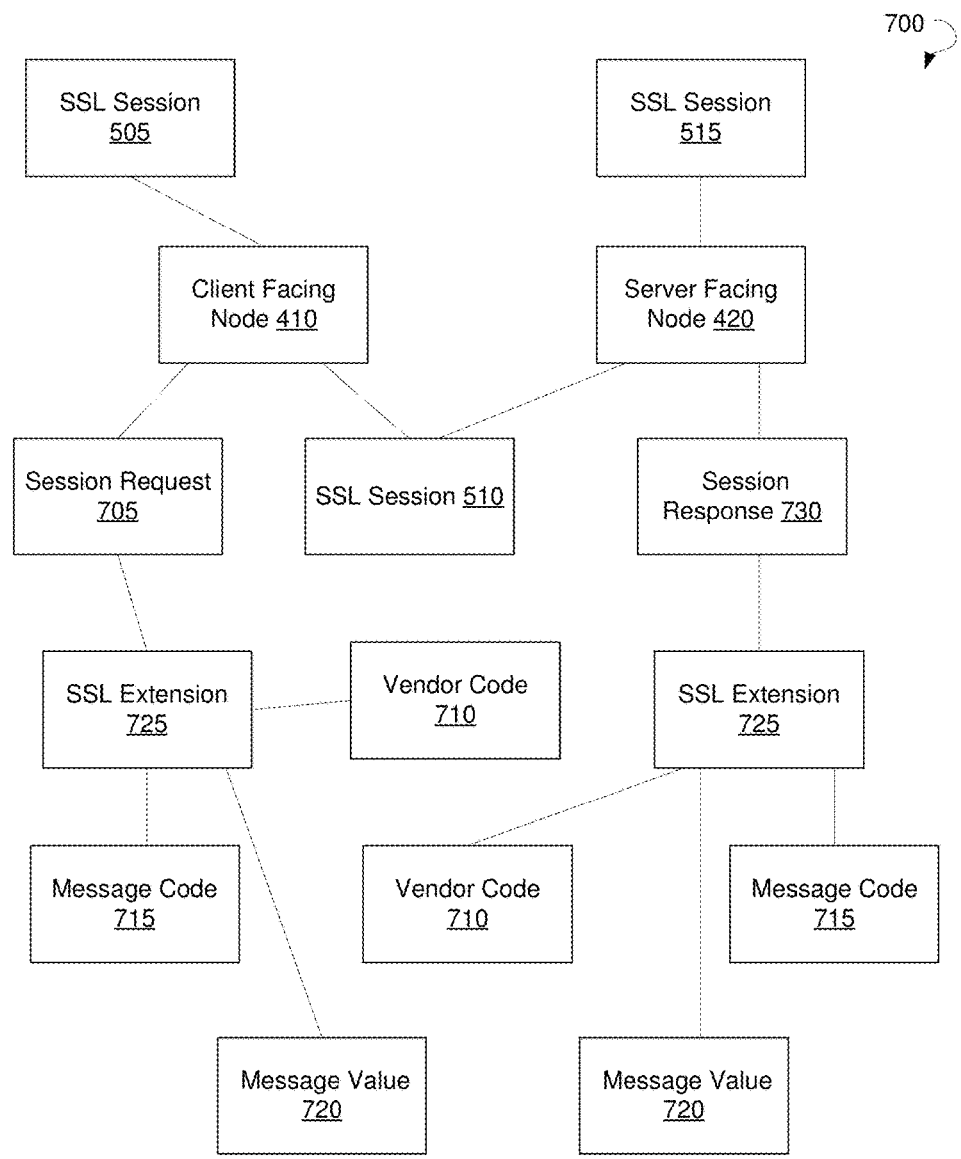
FIG. 7 is a block diagram illustrating establishing a secure SSL session by exchanging control information.

FIG. 7 is a block diagram 700 illustrating establishing a secure SSL session by exchanging control information, according to an example embodiment. In an example embodiment, the client facing node 410 sends a session request 705 to the server facing node 420 to establish an SSL session 510, in order to relay an SSL session 505. In an example embodiment, the session request 705 follows a TLS protocol or an SSL protocol and includes a control message, for example, in a Client Hello message. In an example embodiment, the control message may include an SSL extension 725. In an example embodiment, the session request 705 may include the control message as a separate message from the Client Hello message. In an example embodiment, the SSL extension 725 of the control message may include a vendor code 710, a message code 715, and optionally a message value 720. In an example embodiment, the vendor code 710 may indicate a company identity, such as "A10 Networks," "AT&T," "Cisco," an identity number, an assigned identity from a standardization organization, or an identity previously known to the client facing node 410 and the server facing node 420. In an example embodiment, the SSL extension 725 may include at least a message code 715 and optionally a message value 720.

In a further example embodiment, the server facing node 420 may receive the session request 705 from the client facing node 410 to establish the SSL session 510, in order to relay the SSL session 505. The server facing node 420 may establish an SSL session 515 according to the session request 705. In an example embodiment, the server facing node 420 may send a session response 730 to the client facing node 410 as a response to the session request 705. In an example embodiment, the server facing node 420 may generate an extended session request in a form of a control message having an SSL extension 715 and may send the control message in a session response 730. In an example embodiment, the session response 730 follows a TLS or SSL protocol and includes a control message in a Server Hello message. In an example embodiment, the session response 730 includes a control message having an SSL extension 725 as a separate message from Server Hello message. In an example embodiment, the SSL extension 725 in the control message may include a vendor code 710, a message code 715, and optionally a message value 720. In an example embodiment, vendor code 710 indicates a company identity such as "A10 Networks," "AT&T," "Cisco," an identity number, an assigned identity from a standardization organization, or an identity previously known to the client facing node 410 and the server facing node 420. In an example embodiment, the control message is generated by the server facing node 420 based on the SSL session 515.

The client facing node 410 may or may not encrypt the control message comprising the SSL extension 725. In an example embodiment, the server facing node 420 may receive the session request 705 and may need to decrypt the control message in order to retrieve the vendor code 710, the message code 715, and the message value 720 from the control message. Similarly, the server facing node 420 may or may not encrypt the control message. In an example embodiment, the client facing node 410 may receive session response 730 and may need to decrypt the control message in order to retrieve the SSL extension 725, such as the vendor code 710, the message code 715, and the message value 720.

Figure 8:
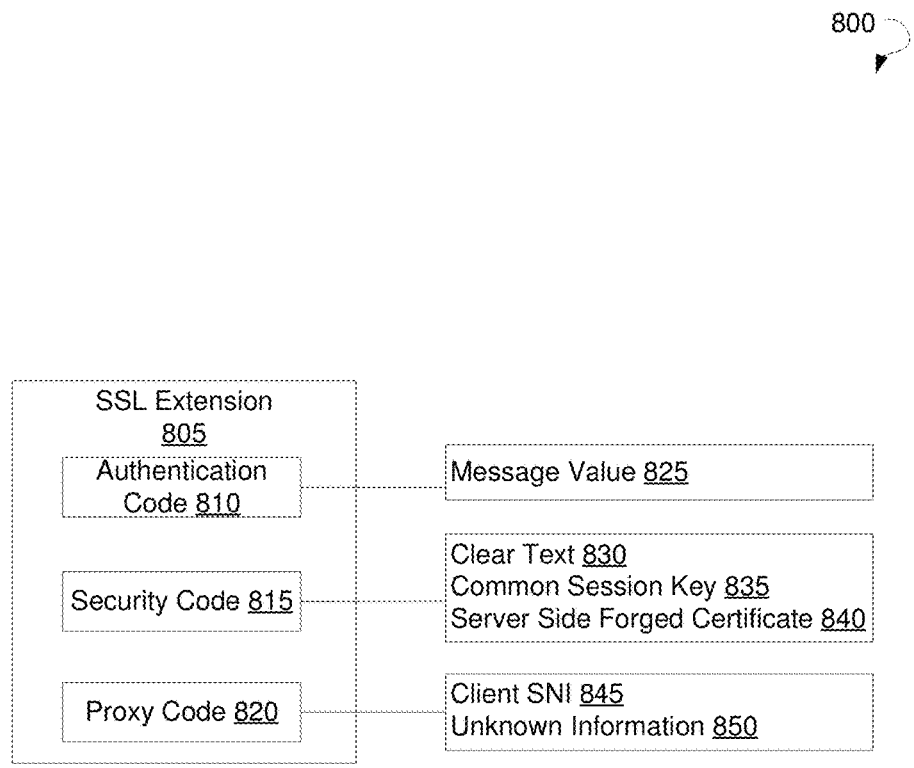
FIG. 8 is a block diagram illustrating an SSL extension.

FIG. 8 is a block diagram 800 illustrating an SSL extension. The SSL extension 805 may include an authentication code 810, a security code 815 indicating clear text 830, or a common session key 835. The SSL extension 805 may include a proxy code 820 indicating a server side forged certificate 840, a client SNI 845, or a unknown information 850.

The authentication code 810 may be associated with a code stored in a message value 825, which is used by the receiving SSL gateway (e.g., the server facing node) to authenticate the sending SSL gateway (e.g., a client facing node).

The security code 815 may be used to negotiate a level of security for a secure SSL session between two SSL gateways. The clear text 830 may indicate that the secure session does not use any encryption for the data content. There is no associated message value 825 for the clear text 830. The common session key 835 may be associated with a key stored in the message value 825, which may be used by each of the SSL gateways to retrieve a pre-stored encryption/decryption key for processing the SSL session between the two SSL gateways.

The proxy code 820 may be associated with the message value 825 to be relayed to the SSL session 515 to the server 130 or the SSL session 505 to the client 120. The client SNI 845 may indicate that the message value 825 includes an SNI obtained from the SSL session 505 and is to be relayed to the SSL session 515. The server side forged certificate 840 may indicate that the message value 825 is a server security certificate obtained from the SSL session 515 and is to be relayed to the SSL session 505. The unknown information 850 may indicate that the message value 825 is to be relayed to the SSL session 515 or the SSL session 505 accordingly.

Figure 9:
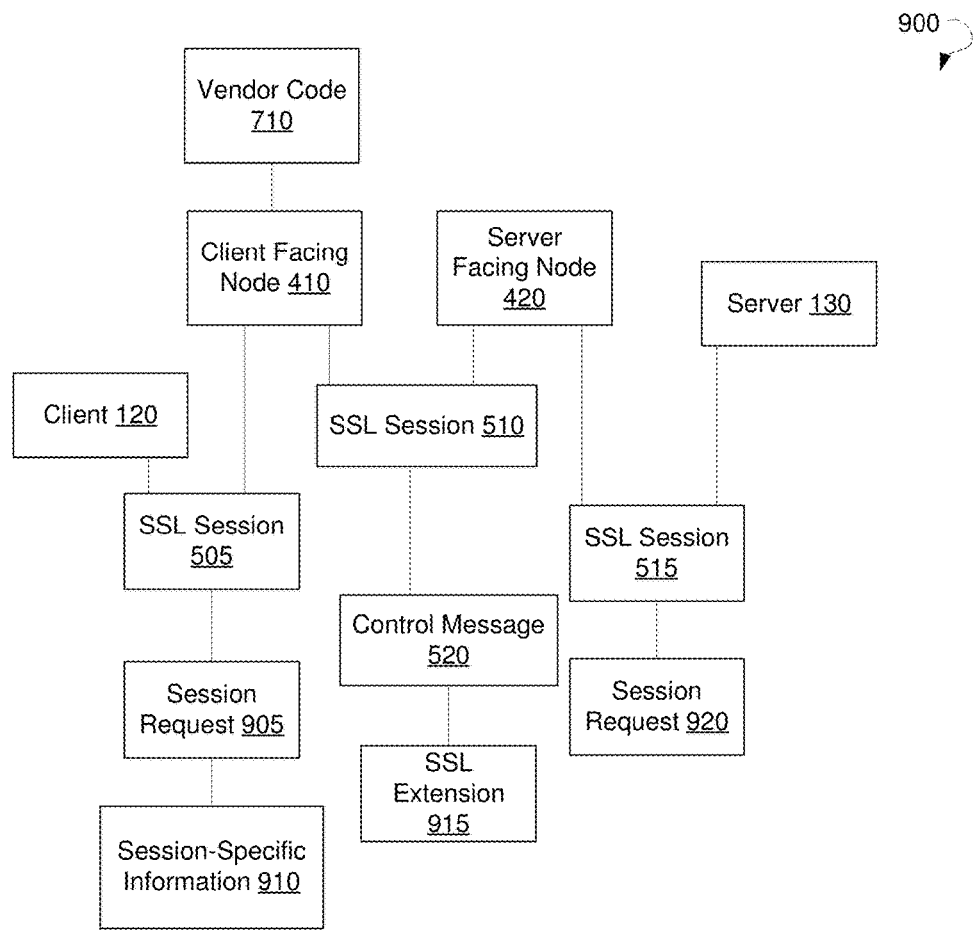
FIG. 9 is a block diagram illustrating relaying session-specific information of a client between SSL gateways.

FIG. 9 is a block diagram 900 illustrating relaying session-specific information of a client between the SSL gateways, according to an example embodiment. In an example embodiment, the client 120 may send a session request 905 to the client facing node 410 to establish the SSL session 505. The client 120 may add exception information shown as session-specific information 910 into the session request 905 so that the session-specific information 910 can be delivered to the server 130. In an example embodiment, the session request 905 may include a Client Hello message and the session-specific information 910 may be encoded in a format different from a Client Hello message format. In an example embodiment, the client facing node 410 may receive the session request 905 over the SSL session 505 and determine that the session-specific information 910 needs to be processed. The client facing node 410 may process the session-specific information 910 and create, based on the session-specific information 910, an extended session request shown as a control message 520. An SSL extension 915 may be added to the control message 520. More specifically, the session-specific information 910 may be added into the SSL extension 915.

In an example embodiment, the client facing node 410 may determine that the session-specific information 910 in the session request 905 includes a SNI, retrieve the SNI, and store the retrieved SNI of the session-specific information 910 into the SSL extension 915 of the control message 520. The SSL extension 915 may include a message code indicating a proxy code of "Client SNI" and a message value including the retrieved SNI. In an example embodiment, the client facing node 410 may further process the retrieved SNI according to a security network policy. In an example embodiment, the client facing node 410 may determine that the session-specific information 910 includes a piece of unknown information. The client facing node 410 may store the unknown information into the SSL extension 915 of the control message 520 with a message code indicating a proxy code of "Unknown Information" and a message value including the unknown information of the session-specific information 910. In an example embodiment, the client facing node 410 may send the control message 520 having the SSL extension 915 to the server facing node 420 in a session request to establish the SSL session 510 as illustrated on FIG. 7. In an example embodiment, the server facing node 420 may receive the control message 520 from the client facing node 410. The server facing node 420 may process the control message 520 to retrieve the SNI or the unknown information from the SSL extension 915. The server facing node 420 may add the retrieved SNI or the unknown information into a session request 920, and send the session request 920 to the server 130 to establish the SSL session 515. In an example embodiment, prior to sending the session request 920 to the server 130, the server facing node 420 may encode the retrieved SNI or the unknown information in a format similar to the session-specific information 910 in the session request 905.

In an example embodiment, the client facing node 410 may include a pre-stored vendor code 710 and add the vendor code 710 into the SSL extension 915 of the control message 520. In a further example embodiment, the client facing node 410 may add one or more message codes and message value pairs into the SSL extension 915 of the control message 520.

Figure 10:
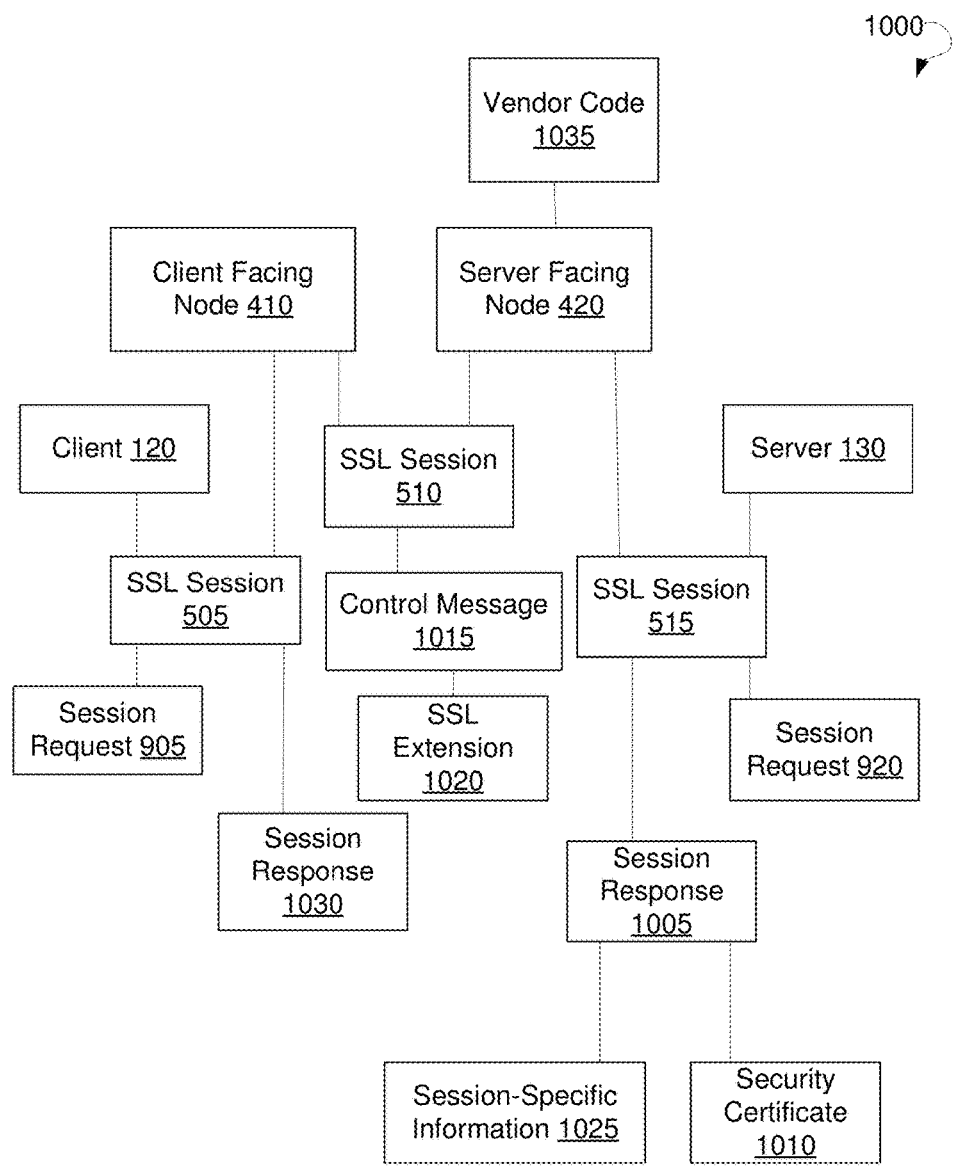
FIG. 10 is a block diagram illustrating relaying session-specific information of a server between SSL gateways.

FIG. 10 is a block diagram 1000 illustrating relaying session-specific information of a server between the SSL gateways, according to an example embodiment. In an example embodiment, in response to the received session request 920 from the server facing node 420, the server 130 may send a session response 1005 in order to establish the SSL session 515. In an example embodiment, the server 130 may put a security certificate 1010 into session response 1005. In an example embodiment, the session response 1005 may include a Server Hello message. In an example embodiment, the server facing node 420 may receive the session response 1005 and retrieve a security certificate 1010 from the session request 920. The server facing node 420 may determine, e.g., via a network security application being executed in the server facing node 420, that a security certificate 1010 of the server 130 includes a forged security certificate. The network security application may also be remotely connected to the server facing node 420 (e.g., via a cloud network). The server facing node 420 may create a control message 1015 containing an SSL extension 1020. The SSL extension 1020 may include a message code indicating a security code of the server side forged security certificate, and a message value including the retrieved forged certificate. In an example embodiment, the server facing node 420 may send the control message 1015 to the client facing node 410.

In an example embodiment, the server 130 may place the session-specific information 1025 encoded in a format different from a Server Hello message into the session response 1005. The server facing node 420 may receive the session response 1005 and retrieve the session-specific information 1025. In an example embodiment, the server facing node 420 may add into the control message 1015 a message code indicating a proxy code and a message value including the session-specific information 1025. The server facing node 420 may send the control message 1015 to the client facing node 410.

In an example embodiment, the client facing node 410 may receive and process the control message 1015. In an example embodiment, the client facing node 410 may retrieve the server-side forged security certificate from the SSL extension 1020 of the control message 1015. The client facing node 410 may further process the retrieved server-side forged security certificate with a network security application included in the client facing node 410 or remotely connected to the client facing node 410, (e.g., via a cloud network). In an example embodiment, the client facing node 410 may determine that the control message 1015 includes the session-specific information 1025. Based on the determination, the client facing node 410 may add the session-specific information 1025 into a session response 1030 and send session response 1030 to the client 120 as a response to the session request 905. In an example embodiment, the client facing node 410 may encode the session-specific information 1025 in the session response 1030 in a similar format as the session-specific information 1025 is encoded in the session response 1005.

In an example embodiment, the server facing node 420 may have a pre-stored vendor code 1035 and may include the vendor code 1035 into the control message 1015. In a further example embodiment, the server facing node 420 may add one or more message code and message value pairs into the control message 1015.

Figure 11:
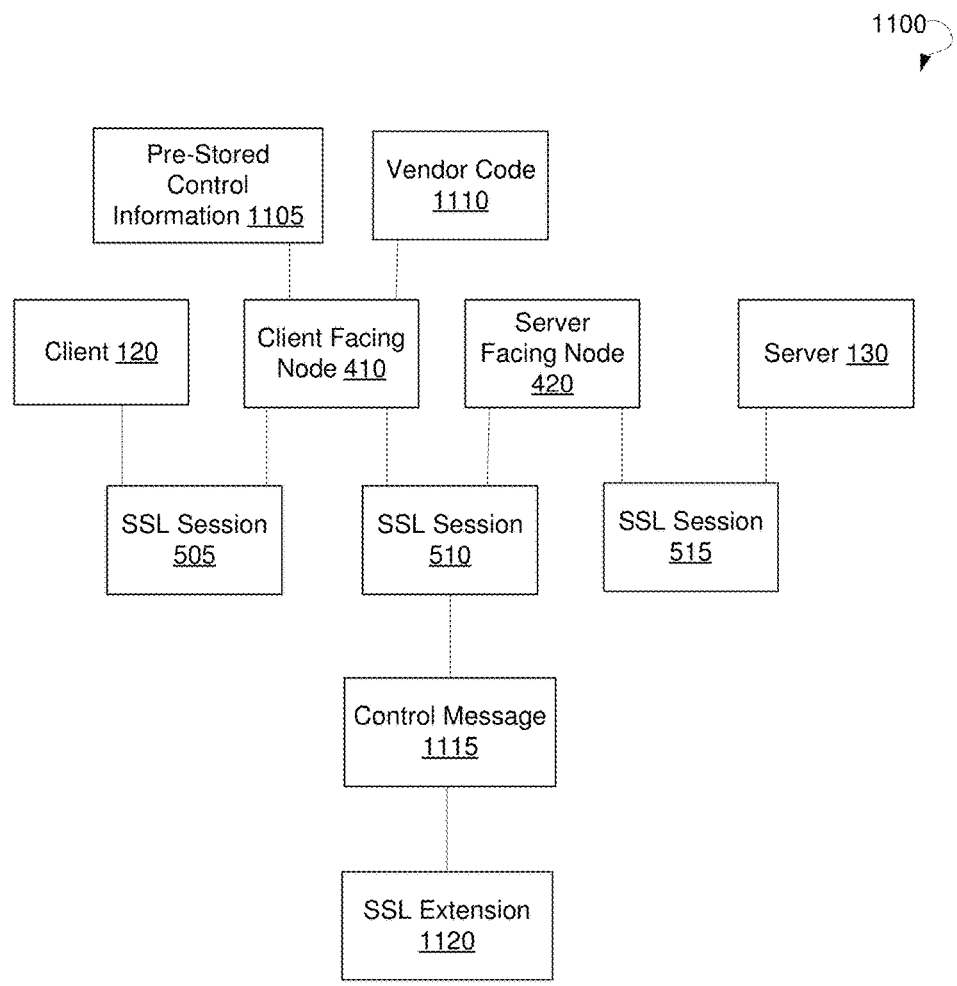
FIG. 11 is a block diagram illustrating sending a control message based on pre-stored control information.

FIG. 11 is a block diagram 1100 illustrating sending a control message based on pre-stored control information, according to an example embodiment. In an example embodiment, the client facing node 410 may have a pre-stored control information 1105, which may include an authentication code or one or more security codes, and a pre-stored vendor code 1110. In an example embodiment, the client facing node 410 may receive a request from a client 120 to establish an SSL session 505. The client facing node 410 may create, based on pre-stored control information 1105, a control message 1115. More specifically, the client facing node 410 may insert the vendor code 1110 into an SSL extension 1120 of the control message 1115. The client facing node 410 may determine that pre-stored control information 1105 includes an authentication code and an authentication key. The client facing node 410 may add, into the SSL extension 1120 of the control message 1115, a message code, an authentication code, and a message value including the authentication key stored in the pre-stored control information 1105. In an example embodiment, the client facing node 410 may determine that the pre-stored control information 1105 includes one or more security codes and associated security values. For each of the security code and security value pair, the client facing node 410 may add a message code in to the SSL extension 1120 of the control message 1115. The message code may include the security code and a message value for the security code.

Upon creating the control message 1115, the client facing node 410 may send the control message 1115 in a session request to the server facing node 420 to establish the SSL session 510. In an example embodiment, the server facing node 420 may receive the control message 1115 and process the control message 1115 accordingly, as described with regard to FIGS. 9 and 10. In an example embodiment, the server facing node 420 may establish the SSL session 515 with the server 130.

Figure 12:
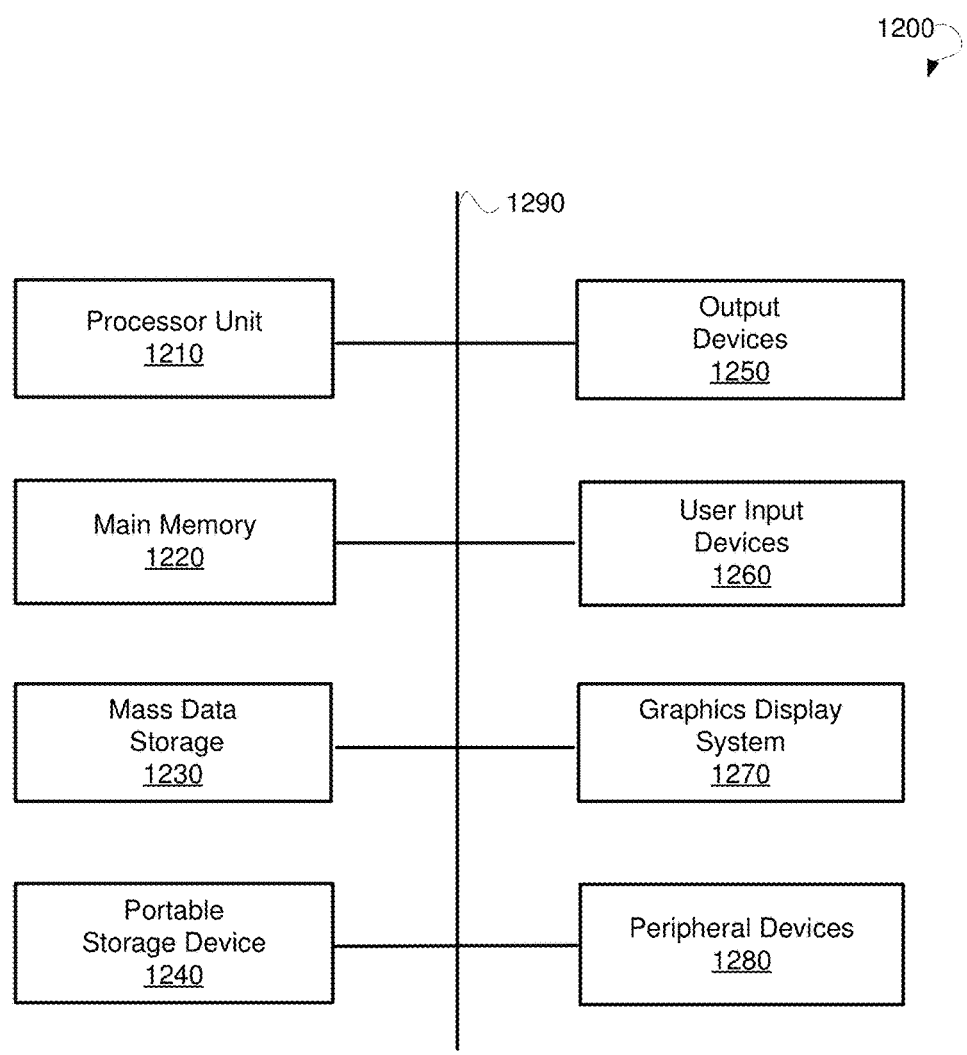
FIG. 12 shows a diagrammatic representation of a computing device for a machine, within which a set of instructions for causing the machine to perform any one or more of the methodologies discussed herein can be executed.

FIG. 12 illustrates a computer system 1200 that may be used to implement embodiments of the present disclosure, according to an example embodiment. The computer system 1200 may serve as a computing device for a machine, within which a set of instructions for causing the machine to perform any one or more of the methodologies discussed herein can be executed. The computer system 1200 can be implemented in the contexts of the likes of computing systems, networks, servers, or combinations thereof. The computer system 1200 includes one or more processor units 1210 and main memory 1220. Main memory 1220 stores, in part, instructions and data for execution by processor units 1210. Main memory 1220 stores the executable code when in operation. The computer system 1200 further includes a mass data storage 1230, a portable storage device 1240, output devices 1250, user input devices 1260, a graphics display system 1270, and peripheral devices 1280. The methods may be implemented in software that is cloud-based.

The components shown in FIG. 12 are depicted as being connected via a single bus 1290. The components may be connected through one or more data transport means. Processor units 1210 and main memory 1220 are connected via a local microprocessor bus, and mass data storage 1230, peripheral devices 1280, the portable storage device 1240, and graphics display system 1270 are connected via one or more I/O buses.

Mass data storage 1230, which can be implemented with a magnetic disk drive, solid state drive, or an optical disk drive, is a non-volatile storage device for storing data and instructions for use by processor units 1210. Mass data storage 1230 stores the system software for implementing embodiments of the present disclosure for purposes of loading that software into main memory 1220.

The portable storage device 1240 operates in conjunction with a portable non-volatile storage medium, such as a floppy disk, a CD, a DVD, or USB storage device, to input and output data and code to and from the computer system 1200. The system software for implementing embodiments of the present disclosure is stored on such a portable medium and input to the computer system 1200 via the portable storage device 1240.

User input devices 1260 provide a portion of a user interface. User input devices 1260 include one or more microphones, an alphanumeric keypad, such as a keyboard, for inputting alphanumeric and other information, or a pointing device, such as a mouse, a trackball, stylus, or cursor direction keys. User input devices 1260 can also include a touchscreen. Additionally, the computer system 1200 includes output devices 1250. Suitable output devices include speakers, printers, network interfaces, and monitors.

Graphics display system 1270 includes a liquid crystal display or other suitable display device. Graphics display system 1270 receives textual and graphical information and processes the information for output to the display device. Peripheral devices 1280 may include any type of computer support device to add additional functionality to the computer system.

The components provided in the computer system 1200 of FIG. 12 are those typically found in computer systems that may be suitable for use with embodiments of the present disclosure and are intended to represent a broad category of such computer components that are well known in the art. Thus, the computer system 1200 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1200 may be implemented as a cloud-based computing environment, such as a virtual machine operating within a computing cloud. In other embodiments, the computer system 1200 may itself include a cloud-based computing environment, where the functionalities of the computer system 1200 are executed in a distributed fashion. Thus, the computer system 1200, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1200, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for exchanging control information between SSL gateways have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for exchanging control information between secure socket layer (SSL) gateways, the system comprising:
    a client facing node operable to:
        intercept a client request from a client including a session request and session-specific information, the session request including a request to establish an SSL communication session between the client and a server;
        determine that a data traffic channel established between the client facing node and a server facing node is unable to carry the session-specific information to the server facing node in the client request;
        based on the determination, generate an SSL extension based on the session-specific information;
        modify the session request by adding the SSL extension to the session request to obtain an extended session request; and
        send the extended session request to the server facing node; and
    the server facing node in communication with the client facing node via the data traffic channel, the server facing node being operable to:
        identify the session-specific information contained in the SSL extension of the extended session request;
        based on the session-specific information and the extended session request, generate a further session request for establishing the SSL communication session between the server facing node and the server; and
        send the further session request to the server.

2. The system of claim 1, wherein the obtaining the extended session request includes adding the SSL extension to a header of a data packet associated with the session request.

3. The system of claim 1, wherein the server facing node is further operable to:
  responsive to the sending of the further session request to the server, receive a security certificate from the server;
  upon receiving the security certificate, forge the security certificate to obtain a forged security certificate; and
  provide the forged security certificate to the client facing node;
  wherein the security certificate is used for establishing a first secure connection between the server and the server facing node, the forged security certificate being used for establishing a second secure connection between the client facing node and the client.

4. The system of claim 3, wherein the SSL communication session includes the first secure connection between the server and the server facing node and the second secure connection between the client facing node and the client.

5. The system of claim 3, wherein the SSL extension present in the further session request is ignored by the server; and
  wherein the security certificate is sent by the server in response to the further session request received from the server facing node.

6. The system of claim 1, wherein the client facing node is further operable to:
  analyze the session-specific information;
  based on the analyzing, determine that a forged security certificate is preliminarily generated by the server facing node for the server; and
  based on the determining, insert a control message into the SSL extension, the control message including an instruction for the server facing node to provide the forged security certificate to the client facing node.

7. The system of claim 1, wherein the client facing node is further operable to:
  decrypt the session request to obtain a decrypted session request in a form of a clear text, wherein the extended session request is created based on the decrypted session request; and
  add, into the SSL extension, an indication that the extended session request is in the form of the clear text to avoid decryption of the extended session request by the server facing node.

8. The system of claim 1, further comprising a monitoring node located between the client facing node and the server facing node,
  wherein the sending of the extended session request from the client facing node to the server facing node includes:
    sending, by the client facing node, the extended session request to the monitoring node;
    inspecting, by the monitoring node, the extended session request based on an instruction present in the SSL extension; and
    sending, by the monitoring node, the extended session request inspected by the monitoring node to the server facing node.

9. The system of claim 1, wherein the session-specific information is associated with one or more of the following: a clear text, a common session key, a server side forged security certificate, a client Server Name Indication (SNI), and unknown information.

10. The system of claim 1, wherein the SSL extension present in the extended session request is sent by the client facing node to the server facing node in a non-encrypted form; and
  wherein the session request present in the extended session request is sent by the client facing node to the server facing node in an encrypted form.

11. A method for exchanging control information between secure socket layer (SSL) gateways, the method comprising:
  intercepting, by a client facing node, a client request including a session request and session-specific information, the session request including a request to establish an SSL communication session between a client and a server;
  determining, by the client facing module, that a data traffic channel established between the client facing node and a server facing node is unable to carry the session-specific information to the server facing node in the client request
  based on the determination, generating, by the client facing node, an SSL extension based on the session-specific information;
  modifying, by the client facing node, the session request by adding the SSL extension to the session request to obtain an extended session request;
  sending, by the client facing node, the extended session request to the server facing node, the server facing node being in communication with the client facing node via the data traffic channel;
  identifying, by the server facing node, the session-specific information contained in the SSL extension of the extended session request;
  based on the session-specific information and the extended session request, generating, by the server facing node, a further session request for establishing the SSL communication session between the server facing node and the server; and
  sending, by the server facing node, the further session request to the server.

12. The method of claim 11, wherein the obtaining the extended session request includes adding the SSL extension to a header of a data packet associated with the session request.

13. The method of claim 11, further comprising:
  responsive to the sending of the further session request to the server, receiving, by the server facing node, a security certificate from the server;
  upon receiving the security certificate, forging, by the server facing node, the security certificate to obtain a forged security certificate; and
  providing, by the server facing node, the forged security certificate to the client facing node;
  wherein the security certificate is used for establishing a first secure connection between the server and the server facing node, the forged security certificate being used for establishing a second secure connection between the client facing node and the client.

14. The method of claim 13, wherein the SSL communication session includes the first secure connection between the server and the server facing node and the second secure connection between the client facing node and the client.

15. The method of claim 13, wherein the SSL extension present in the further session request is ignored by the server; and
  wherein the security certificate is sent by the server in response to the further session request received from the server facing node.

16. The method of claim 11, further comprising:
  analyzing, by the client facing node, the session-specific information;

based on the analyzing, determining, by the client facing node, that a forged security certificate is preliminarily generated by the server facing node for the server; and based on the determining, inserting, by the client facing node, a control message into the SSL extension, the control message including an instruction for the server facing node to provide the forged security certificate to the client facing node.

17. The method of claim 11, further comprising:

decrypting, by the client facing node, the session request to obtain a decrypted session request in a form of a clear text, wherein the extended session request is created based on the decrypted session request; and adding, by the client facing node, into the SSL extension, an indication that the extended session request is in the form of the clear text to avoid decryption of the extended session request by the server facing node.

18. The method of claim 11, wherein a monitoring node is located between the client facing node and the server facing node, wherein the sending of the extended session request from the client facing node to the server facing node includes:

sending, by the client facing node, the extended session request to the monitoring node;

inspecting, by the monitoring node, the extended session request based on an instruction present in the SSL extension; and sending, by the monitoring node, the extended session request inspected by the monitoring node to the server facing node.

19. The method of claim 11, wherein the SSL extension present in the extended session request is sent by the client facing node to the server facing node in a non-encrypted form; and wherein the session request present in the extended session request is sent by the client facing node to the server facing node in an encrypted form.

20. A system for exchanging control information between secure socket layer (SSL) gateways, the system comprising:

a client facing node operable to:

intercept a client request from a client including a session request and session-specific information, the session request including a request to establish an SSL communication session between the client and a server;

determine that a data traffic channel established between the client facing node and a server facing node is unable to carry the session-specific information to the server facing node in the client request based on the determination, generate an SSL extension based on the session-specific information;

modify the session request by adding the SSL extension to the session request to obtain an extended session request; and send the extended session request to the server facing node; and the server facing node in communication with the client facing node via the data traffic channel, the server facing node being operable to:

identify the session-specific information contained in the SSL extension of the extended session request, wherein the SSL extension present in the extended session request is sent by the client facing node to the server facing node in a non-encrypted form; and wherein the session request present in the extended session request is sent by the client facing node to the server facing node in an encrypted form;

based on the session-specific information and the extended session request, generate a further session request for establishing the SSL communication session between the server facing node and the server;

send the further session request to the server;

responsive to the sending of the further session request to the server, receive a security certificate from the server;

upon receiving the security certificate, forge the security certificate to obtain a forged security certificate; and provide the forged security certificate to the client facing node;

wherein the security certificate is used for establishing a first secure connection between the server and the server facing node, the forged security certificate being used for establishing a second secure connection between the client facing node and the client.

* * * * *